US009348834B2

United States Patent
Bhagavan et al.

(10) Patent No.: US 9,348,834 B2
(45) Date of Patent: May 24, 2016

(54) EFFECTIVE METHOD TO COMPRESS TABULAR DATA EXPORT FILES FOR DATA MOVEMENT

(71) Applicant: International Business Machines Corporation, Armonk, NY (US)

(72) Inventors: Srini Bhagavan, Overland Park, KS (US); Gerald G. Kiernan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 468 days.

(21) Appl. No.: 13/935,005

(22) Filed: Jul. 3, 2013

(65) Prior Publication Data

US 2015/0012506 A1 Jan. 8, 2015

(51) Int. Cl.
*G06F 7/00* (2006.01)
*G06F 17/30* (2006.01)

(52) U.S. Cl.
CPC ................................ *G06F 17/30153* (2013.01)

(58) Field of Classification Search
CPC .............. G06F 17/30153; G06F 17/30; G06F 17/30312; G06F 11/3442; G06F 17/30371; G06F 17/30501; G06F 17/30955; G06F 17/30486; G06F 17/30339
See application file for complete search history.

(56) References Cited

U.S. PATENT DOCUMENTS

| 6,226,411 B1* | 5/2001 | Hiyoshi | G06F 7/36 345/428 |
| 2008/0071818 A1 | 3/2008 | Apanowicz et al. | |
| 2009/0262659 A1* | 10/2009 | Sturges | H04L 63/1416 370/253 |
| 2009/0307214 A1* | 12/2009 | Yoshida | G06F 17/30312 |
| 2010/0169335 A1 | 7/2010 | Cai et al. | |
| 2010/0281004 A1* | 11/2010 | Kapoor | G06F 17/30501 707/693 |
| 2010/0320417 A1* | 12/2010 | Yadav | B01J 12/005 252/182.33 |
| 2012/0143833 A1 | 6/2012 | Ganesh et al. | |

OTHER PUBLICATIONS

Alexander, VL. et al.; "Foreign Column Specification for Database Import/Export"; http://www.ip.com/pubview/IPCOM000034602D; Jan. 27, 2005.

(Continued)

*Primary Examiner* — Azam Cheema
(74) *Attorney, Agent, or Firm* — Michele Liu Baillie; North Shore Patents, P.C.

(57) ABSTRACT

Compression of data for database movement, includes: selecting a first group of categorical columns for compression; selecting a next group of categorical columns from remaining columns for compression; repeating the selecting of the next group until a predetermined compression threshold is met; creating first compression files comprising compressed representations of the columns in the first group; creating next compression files comprising compressed representations of the columns in each of the next groups; storing initial row sort order, group identity, and column positions corresponding to each of the next groups; and storing any columns not selected for compression in an uncompressed file in the original row sort order. Decompression of the data includes: rebuilding categorical columns in each group of compression files using group identity and column positions corresponding to the group; and sorting rows comprising the rebuilt categorical columns to the initial row sort order. Sorted rows for each group are merged with rows in the uncompressed file.

15 Claims, 9 Drawing Sheets

(56) References Cited

OTHER PUBLICATIONS

Trammell, B. et al.; "Specification of the IP Flow Information Export (IPFIX) File Format"; http://www.ip.com/pubview/IPCOM000189183D; Oct. 1, 2009.
Mell, P. et al.; "Draft NIST Working Definition of Cloud Computing"; Oct. 7, 2009.
Roth, M. et al.; "Database Compression"; SIGMOD Record, vol. 22 No. 3; pp. 31-39; Sep. 1993.
Lelewer, D. et al; "Data Compression"; ACM Computing Surveys, vol. 19, No. 3; pp. 261-296; Sep. 1987.
Stonebraker, M. et al; "C-Store: A Column-oriented DBMS"; Proceedings of the 31st VLDB Conference; Trondheim, Norway; pp. 553-564; Sep. 2005.

* cited by examiner

EFFECTIVE METHOD TO COMPRESS TABULAR DATA EXPORT FILES FOR DATA MOVEMENT

BACKGROUND

Cloud computing solutions incorporate database software for managing databases in the cloud. Enterprises with multiple disparate databases can move their databases to the cloud to benefit from the advantages of cloud computing. One existing approach in moving a database is to generate a DDL script to recreate the local database schema on the cloud database. The source tables are exported as files before being moved to cloud storage and loaded on the cloud database.

Network latencies are an important factor when moving a database onto the cloud. In large enterprises, cloud systems may not necessarily be housed locally and can be accessible only through a Virtual Private Network which can further increase latencies. Compression can be used to reduce the size of data files and thus improve file transfer performance. General purpose compression software products exist. However, general purpose compression overlooks compression opportunities that are available with tabular data.

SUMMARY

According to one embodiment of the present invention, a method for compressing data for database movement, comprises: selecting a first group of one or more categorical columns of a table for compression (a categorical column is a column of a table with few distinct values, for example, a gender column has only two possible values); selecting a next group of one or more categorical columns from remaining columns of the table for compression; repeating the selecting of the next group of one or more categorical columns from the remaining columns of the table for compression until a predetermined compression threshold is met; creating a first plurality of compression files comprising compressed representations of the columns in the first group; creating a next plurality of compression files comprising compressed representations of the columns in each of the next groups; storing an initial row sort order, a group identity, and column positions corresponding to each of the next groups; and storing any columns of the table not selected for compression in an uncompressed file in the initial row sort order.

In one aspect of the present invention, the selecting of the first group of the one or more categorical columns of the table for compression comprises: computing a number of distinct values for each column in the table; determining an order of the columns in increasing number of distinct values; sorting the rows in the table according to the order of columns; calculating a compression ratio for each column in the sorted table; and selecting the first group of the one or more categorical columns for compression based on the compression ratio for each column in the sorted table.

In one aspect of the present invention, the calculating the compression ratio for each column in the table comprises: calculating a number of lines needed to represent each column in compressed format to a total number of lines in the table. The table is sorted according to a first set of columns selected for compression, referring to herein as the initial row sort order.

In one aspect of the present invention, the creating of the next plurality of compression files comprising compressed representations of the columns in each of the next groups, comprises: adding a ROWID columns to remaining categorical columns to record the initial row sort order; and for each next group: recalling a number of distinct values for the columns in the next group; sorting the columns in the next group according to the recalled number of distinct values; and creating one or more compression files comprising compressed representations of the columns in the next group.

In one aspect of the present invention, the storing of the initial row sort order, the group identity, and the column positions corresponding to each of the next groups comprises, for each next group: storing the initial row sort order for the categorical columns in the next group in a sort order file corresponding to the next group; and storing the group identity for the next group and the column positions for the categorical columns in the next group in the file names of the next plurality of compression files.

In one aspect of the present invention, the storing of any columns of the table not selected for compression in the uncompressed file in the initial row sort order comprises: storing any non-categorical columns of the table and any categorical columns of the table not selected for compression in the uncompressed file in the initial row sort order.

According to another embodiment of the present invention, a method for decompressing data for database movement, comprises: receiving one or more groups of compression files comprising compressed representations of categorical columns of a table; receiving an initial row sort order, a group identity, and column positions corresponding to each group; receiving an uncompressed file comprising columns of the table not selected for compression in the initial row sort order; for each group, rebuilding each categorical column represented in the compression files of the group using the group identity and the column positions corresponding to the group; for each group, sorting rows comprising the rebuilt categorical columns to the initial row sort order; and merging the sorted rows for each group with rows in the uncompressed file.

In one aspect of the present invention, the sorting of the rows comprising the rebuilt categorical columns to the initial row sort order comprises: for each group, obtaining the initial row sort order for the rebuilt categorical columns in the group from a sort order file corresponding to the group; and for each group, sorting the rows comprising the rebuilt categorical columns in the group to the initial row sort order form the sort order file corresponding to the group.

System and computer program products corresponding to the above-summarized methods are also described and claimed herein.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java, and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an Information Disclosure Statement filed herewith.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
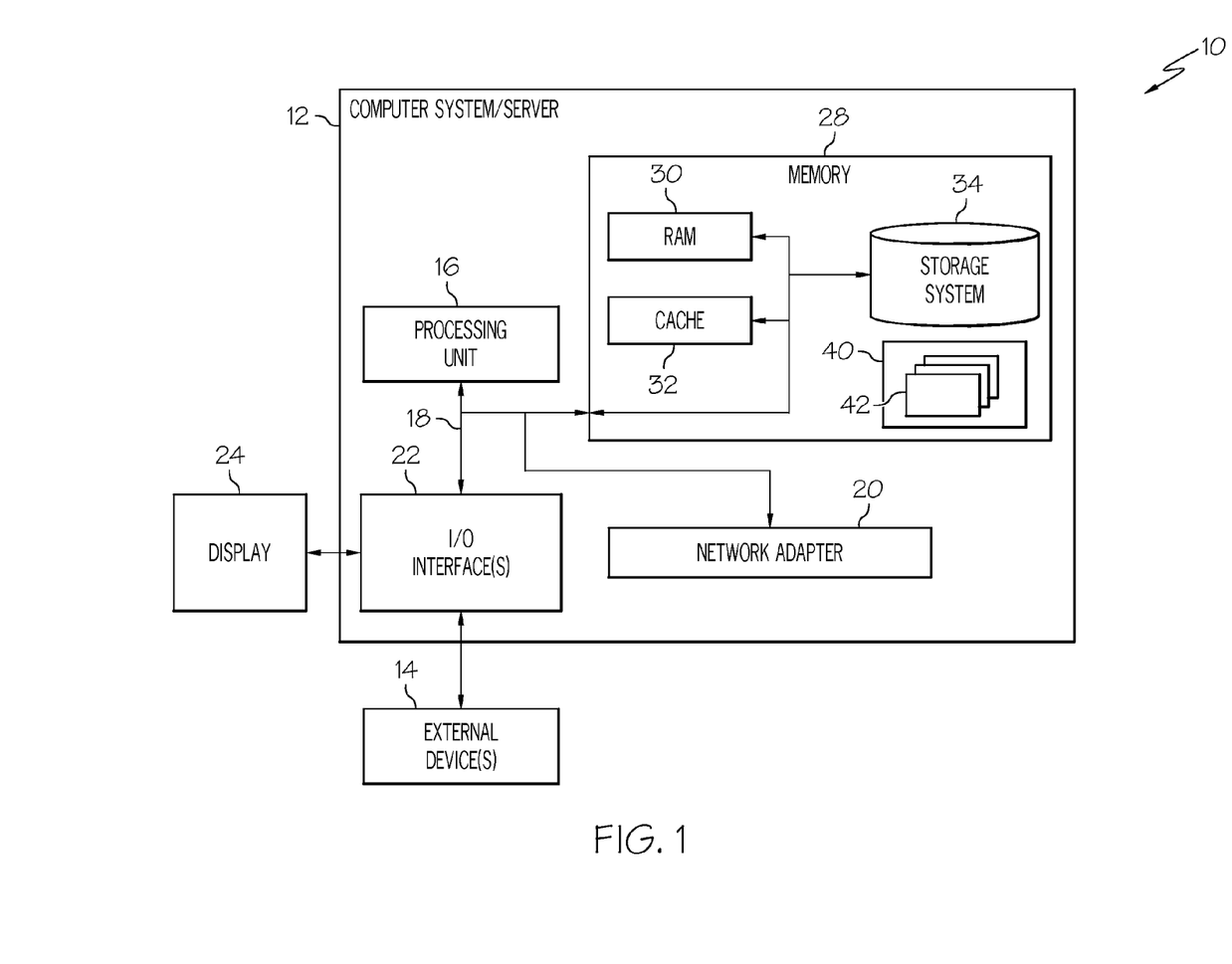
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
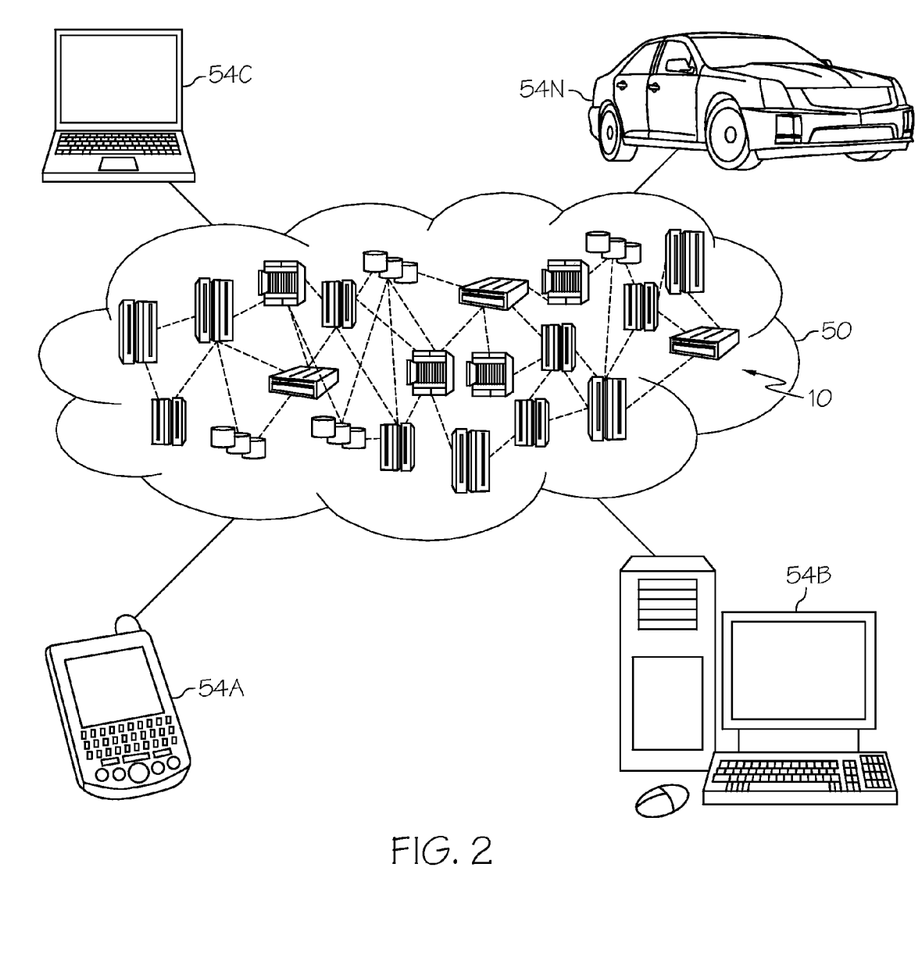
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
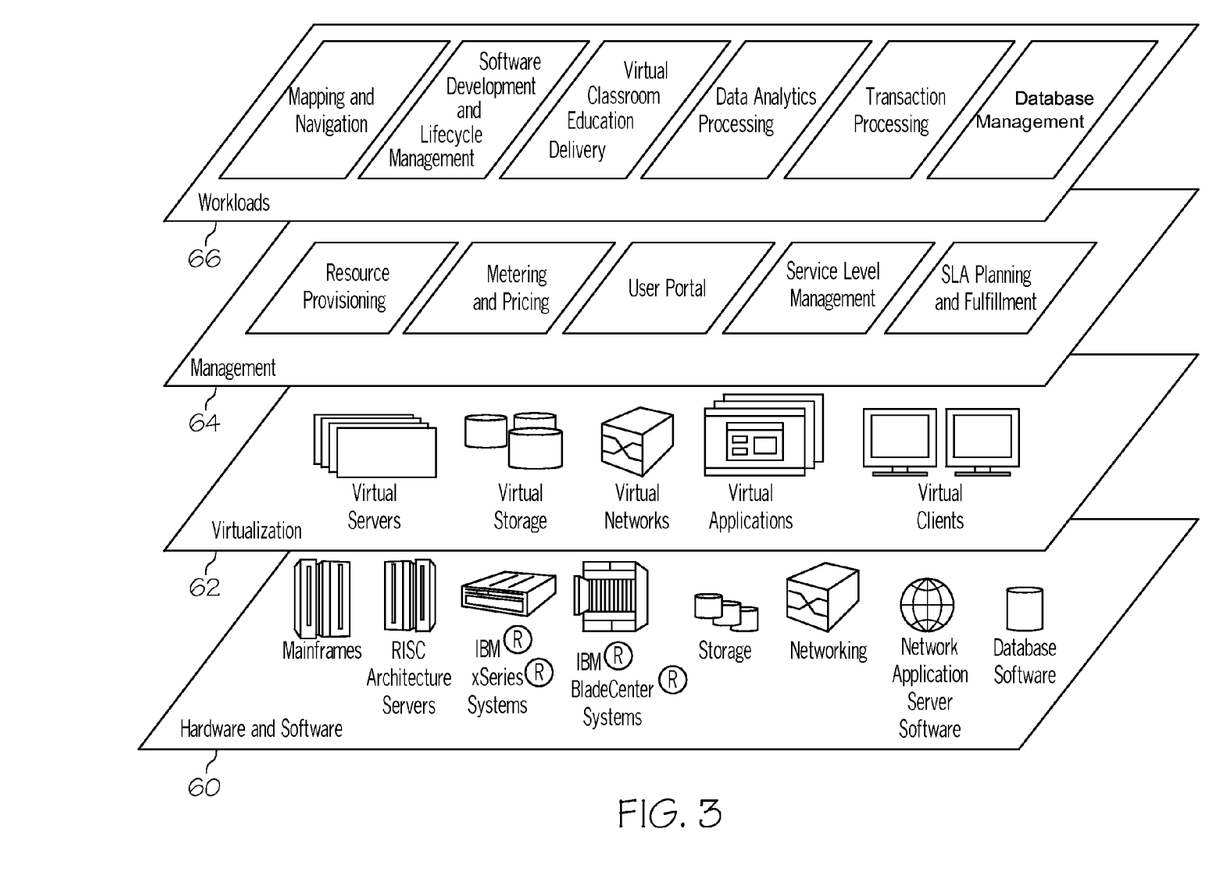
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and database movement.

Embodiments of the present invention remove categorical columns of a table from the data file containing the table and stores compressed representations of the categorical columns in one or more compression files. By removing the categorical columns, the size of the data file is reduced. Decompression reassembles the original data file using the reduced data file and the compressed categorical columns. Compression of the categorical columns may occur on the source system. Invocation of the compression algorithm can be accomplished either locally at the source system or remotely from a remote system. The files containing the table, including the compressed files for the categorical columns, are then sent to the target system. Upon receiving the files containing the table, the target system invokes the decompression algorithm to decompress the compression files and to merge the rows resulting from the decompression of the compression files with the rows in the reduced data file to reassemble the original data file. In this manner, a table of a database may be moved from the source system to the target system with a high degree of compression. The embodiment of the present invention may be used separately or in conjunction with general purpose compression algorithms.

Figure 4:
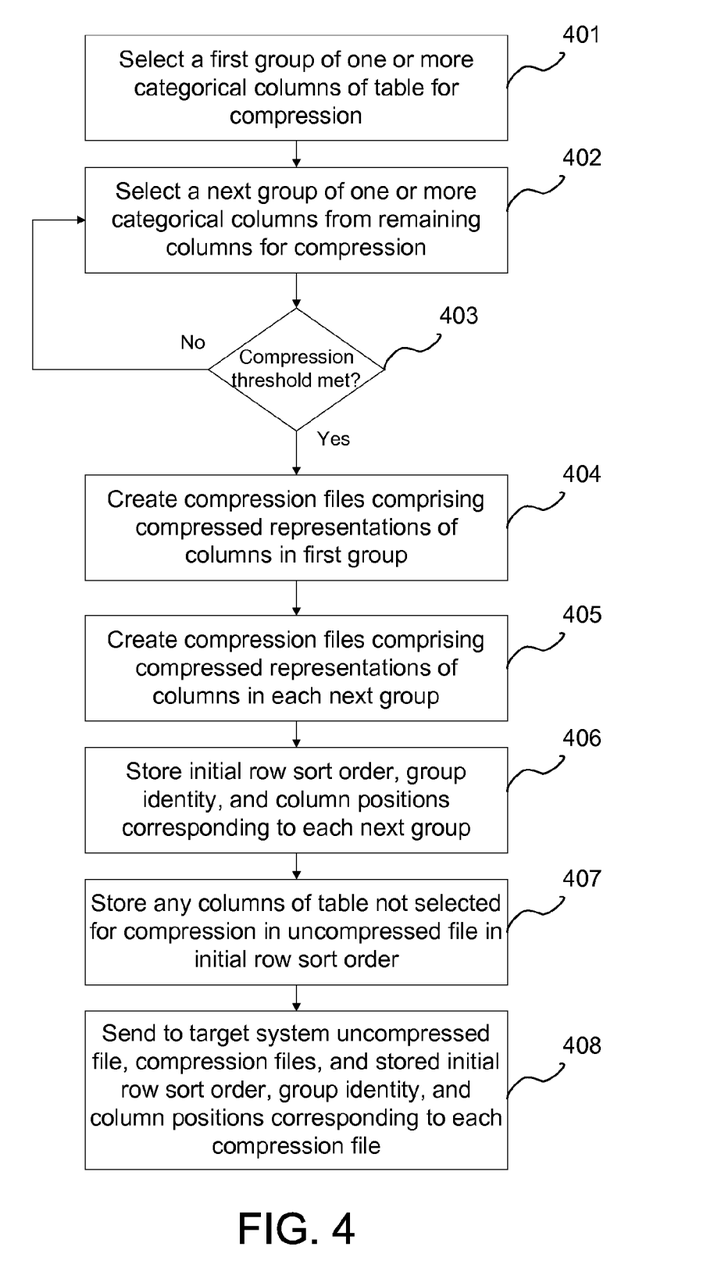
FIG. 4 is a flowchart illustrating a compression of table columns for data movement according to an embodiment of the present invention.

FIG. 4 is a flowchart illustrating a compression of table columns for data movement according to an embodiment of the present invention. The compression algorithm first selects a first group of one or more categorical columns of a table for compression (401). A "categorical column", as used in this specification, refers to a column of a table which contains distinct values that are divisible into categories. A categorical column is a column of table having few distinct values. For example, a column for "gender" of employees at a company contains only two distinct values, male and female. The column for gender would thus be a categorical column. For another example, a column for "social security number" of the employees contains unique values for each employee. Thus, this column isn't a candidate for compression. From the remaining columns of the table, a next group of one or more categorical columns is selected for compression (402). Additional groups of one or more categorical columns are selected for compression until a predetermined compression threshold is met (403).

Once the groups and the number of categorical columns within each group are known, compression may be performed. One or more compression files comprising compressed representations of the columns in the first group are created (404). Compression files comprising compressed representations of the columns in each next group are created (405). The initial row sort order, group identity, and column positions corresponding to each next group are stored (406). Columns of the table not selected for compression are stored in an uncompressed file in the initial row sort order (407). The uncompressed file thus comprises non-categorical columns and categorical columns not selected for compression. The uncompressed file, the compression files for each group, and the initial row sort order, group identity, and column positions corresponding to each group are sent to the target system (408).

Figure 5:
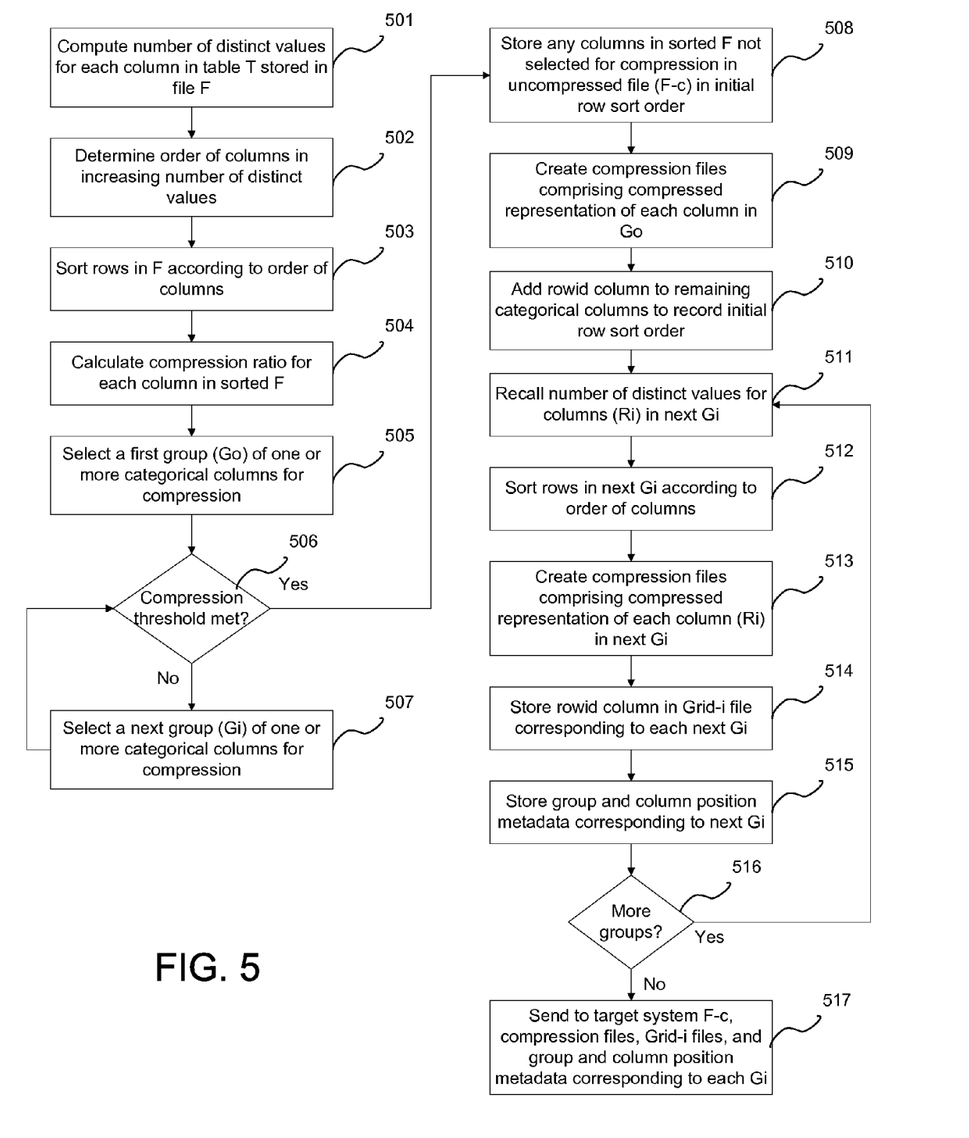
FIG. 5 is a flowchart illustrating in more detail the compression of table columns for data movement according to an embodiment of the present invention.

FIG. 5 is a flowchart illustrating in more detail the compression of table columns for data movement according to an embodiment of the present invention. The compression algorithm first determines which columns of the table are categorical columns. To make this determination, the number of distinct values for each column in a table T stored in file F is computed (501). The order of columns is then determined in increasing number of distinct values (502). For example, assume that table T has d columns, or $T(c_1, \ldots, c_d)$. An array, $V<h_1 \ldots, h_d>$, of hash sets is created to record the individual values in the columns. Here, for each row r in file F, each column value in r is added to $h_i$. Once the rows r in file F are exhausted, a new array, $S<s_1, \ldots, s_d>$, is calculated from the hash sets by retrieving the number of values in each set. This array S is then used to determine the sort order in increasing number of distinct values. Should a size of $h_i$ in array V exceed a predetermined threshold size, the recording of the value of $h_i$ may stop as this indicates that $h_i$ is not a categorical column. To capture further possible compression when column values are correlated, additional passes may be performed on the rows in file F using other hash sets. For each row r in file F, hash values added to each $h_i$ are formed by concatenating all previous values, ensuring a precise count of lines needed to compress a column. For example, assume that d=4 and a sample row r has column values <abc, def, ghi, jkl>. The array of hash values $h_i$ created for this row would be <abc, abcdef, abcdefghi, abcdefghijkl>. As with the first pass, should a size of $h_i$ in the array exceed a predetermined threshold size, the recording of this value of $h_i$ may stop as this indicates that $h_i$ is not a categorical column.

Once the order of columns is determined, the rows in file F are sorted according to the order of columns (503), such that columns with fewer distinct values appear ahead of columns with more distinct values in the sort order. For example, assume that the gender column has the fewest number of distinct values, i.e., two distinct values of "male" and "female". The rows of file F are sorted so that the rows with "male" in the gender column are together, and rows with "female" in the gender column are together. Next, the compression ratio for each column in sorted file F is calculated (504). In this embodiment, the compression ratio is the ratio of the number of lines needed for a column in compressed format to the total number of lines in file F. For example, assume that a gender column is determined to be a categorical column with the least number of distinct values, i.e., "male"

and "female". The compression ratio for the gender column would thus be the ratio of 2 lines to the total number of lines in file F.

A first group $G_o$ of one or more categorical columns with a compression ratio less than a predetermined ratio threshold are then selected for compression (505). Additional (next) groups $G_i$-$G_n$ of one or more categorical columns with a compression ratio less than the predetermined ratio threshold are selected for compression (507) until a predetermined compression threshold is met (506). In this embodiment, the compression threshold is set at a level where grouping of columns benefiting from compression becomes too small. Any columns in sorted file F not selected for compression are stored in an uncompressed file (F-c) in the initial row sort order of sorted file F (508). File F-c contains non-categorical columns of table T and any categorical columns not selected for compression.

In this embodiment, once the compression groups $G_o$-$G_n$ are identified, compression can be performed. Compression files for the columns in the first group $G_o$ are created, where the compression files comprise compressed representation of each column in group $G_o$ (509). In this embodiment, one compression file is created for each column in the group. The compressed representation of a column comprises the form: <value><count>, where <value> is a column value and <count> is the number of times it appears in subsequent rows. For example, assume that a gender column is part of group $G_o$, with two distinct values, i.e., "male" and "female". The first 100 sorted rows have "male" as the value in the gender column, and the next 150 sorted rows have "female" as the value in the gender column. The compressed representation of the gender column is in the form: <male><100>; <female><150>.

For remaining categorical columns ($R_i$), a ROWID column is added to record the initial row sort order in sorted file F (510). The ROWID column assists in the reconstruction of the sort order of sorted file F during the decompression process, as described further below with reference to FIGS. 6-7. The number of distinct values for each column in the (next) group $G_i$ is recalled (511). The rows in $G_i$ are then sorted according to this order of columns determined (512). Compression files comprising compressed representation of each column in the group $G_i$ are created (513). The ROWID column is then stored in a rowid file ($G_{rid\text{-}i}$) corresponding to each group $G_i$ (514). The group and column position metadata corresponding to each group $G_i$ are also stored (515). In this embodiment, the group and column position metadata are stored in the compression file name itself. For example, the file names may be in the form column.<grpid>.<pos>, where "grpid" is the compression group the column belongs to and "pos" is the column's position in the sorted file F. For each group $G_i$ to which the ROWID columns is added, the ROWID column is stored in a file called column.<grpid>.0 during compression. The $0^{th}$ position indicator identifies this file as the $G_{rid\text{-}i}$ file for the group "grpid". In each of these iterations, the ROWID column added in step 510 are extracted and compressed in the $G_{rid\text{-}i}$ file. The compression process (511-515) is repeated for each of the remaining groups (516).

The file F-c, the compression files, the $G_{rid\text{-}i}$ files, and the group and column position metadata corresponding to each group $G_i$ are then sent to the target system to facilitate the movement of the database to the target system (517).

Figure 6:
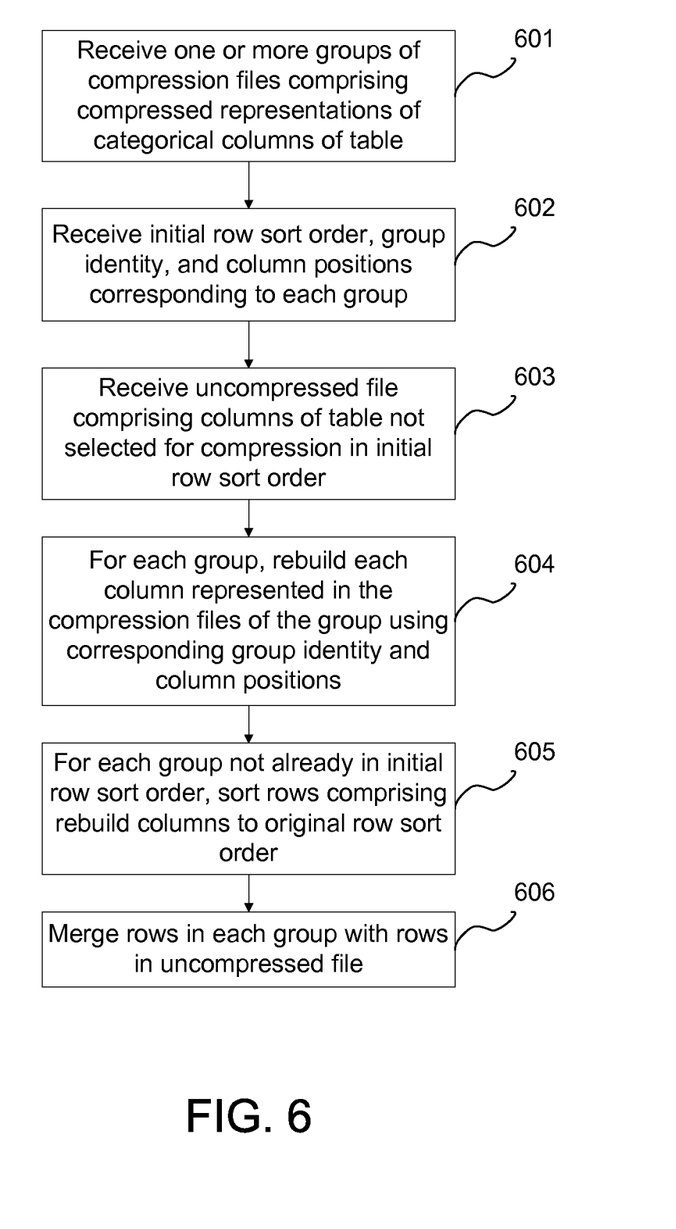
FIG. 6 is a flowchart illustrating a decompression of table columns for data movement according to an embodiment of the present invention.

FIG. 6 is a flowchart illustrating a decompression of table columns for data movement according to an embodiment of the present invention. The target system: receives one or more groups of compression files comprising compressed representations of categorical columns of a table (601); receives the initial row sort order, group identity, and column positions corresponding to each group (602); and receives an uncompressed file comprising the columns of table T not selected for compression, in the initial row sort order (603). For each group of compression files, the decompression algorithm rebuilds each column represented in the compression files of the group using the group identity and column positions corresponding to the group (604). The rows of each group comprising the rebuilt categorical columns not already in the initial row sort order are then sorted to the initial row sort order (605). The sorted rows in each group are then merged with the rows in the uncompressed file (605), resulting in the original sorted file F.

Figure 7:
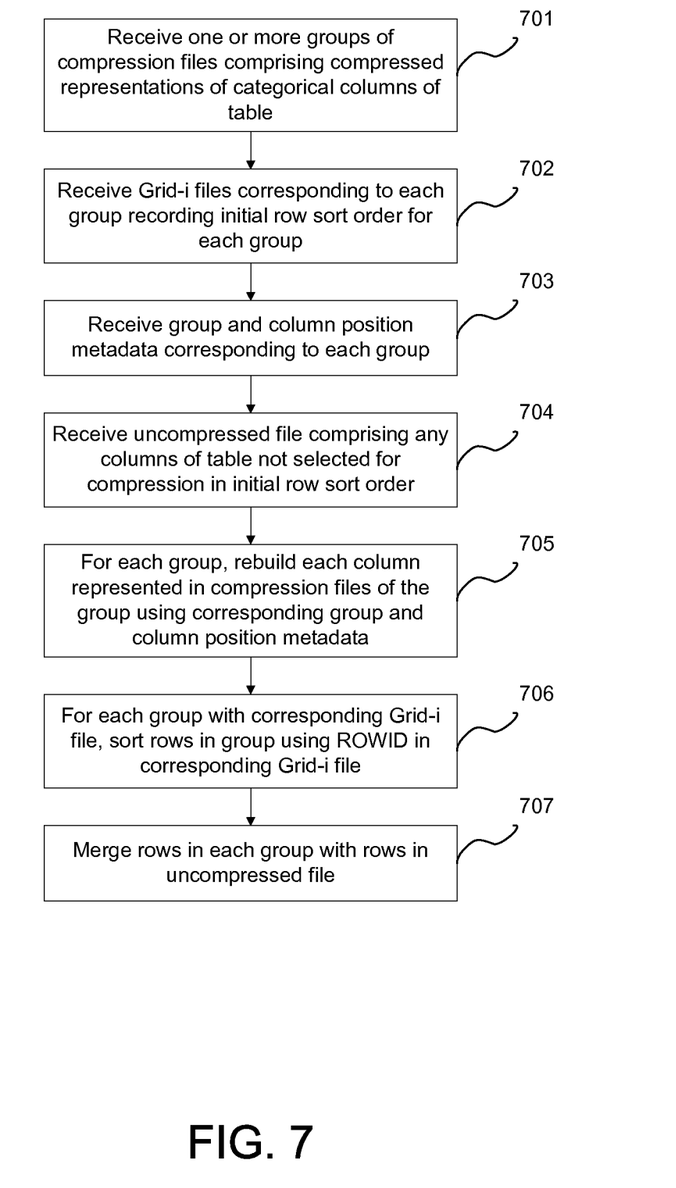
FIG. 7 is a flowchart illustrating in more detail the decompression of table columns for data movement according to an embodiment of the present invention.

FIG. 7 is a flowchart illustrating in more detail the decompression of table columns for data movement according to an embodiment of the present invention. The target system receives one or more groups ($G_i$) of compression files comprising compressed representations of the categorical columns of a table T (701). The target system also receives $G_{rid\text{-}i}$ files corresponding to each group (702). As set forth above, the $G_{rid\text{-}i}$ files store the ROWID column corresponding to each group G. The ROWID column records the initial row sort order in sorted file F for each group. In this embodiment, each group $G_i$ has a corresponding $G_{rid\text{-}i}$ file except for the first group $G_o$. The first group $G_o$ does not require ROWID's as the rows in the first group are already in the initial row sort order in sorted file F. The target system also receives the group and column position metadata corresponding to each group $G_i$ in the compression file name (703), as set forth above, and the uncompressed file (F-c) comprising any columns of table T not selected for compression, in the initial row sort order in sorted file F (704). For each group $G_i$, the decompression algorithm rebuilds each column represented in the compression files of the group using the corresponding group and column position metadata stored in the compression file names (705). In one embodiment, a mapping table is used to assign each group's columns to its original position in the sorted file F. The mapping table is recovered from the metadata stored in the compression file names. For each group with a corresponding $G_{rid\text{-}i}$ file, the rows in the group comprising the rebuilt categorical columns are sorted using the ROWID's in the corresponding $G_{rid\text{-}i}$ file (706). In this embodiment, each group $G_i$ has a corresponding $G_{rid\text{-}i}$ file except for the first group $G_o$. Sorting using the ROWID's places each row in the group into their initial sort orders in file F. The sorted rows in each group are then merged with the rows in the uncompressed file F-c (707). The rows in the uncompressed file F-c are stored in the initial row sort order in sorted file F. Thus when merged with the sorted rows in each group, the resulting rows are reconstructed to the order of the original sorted file F.

Figure 8:
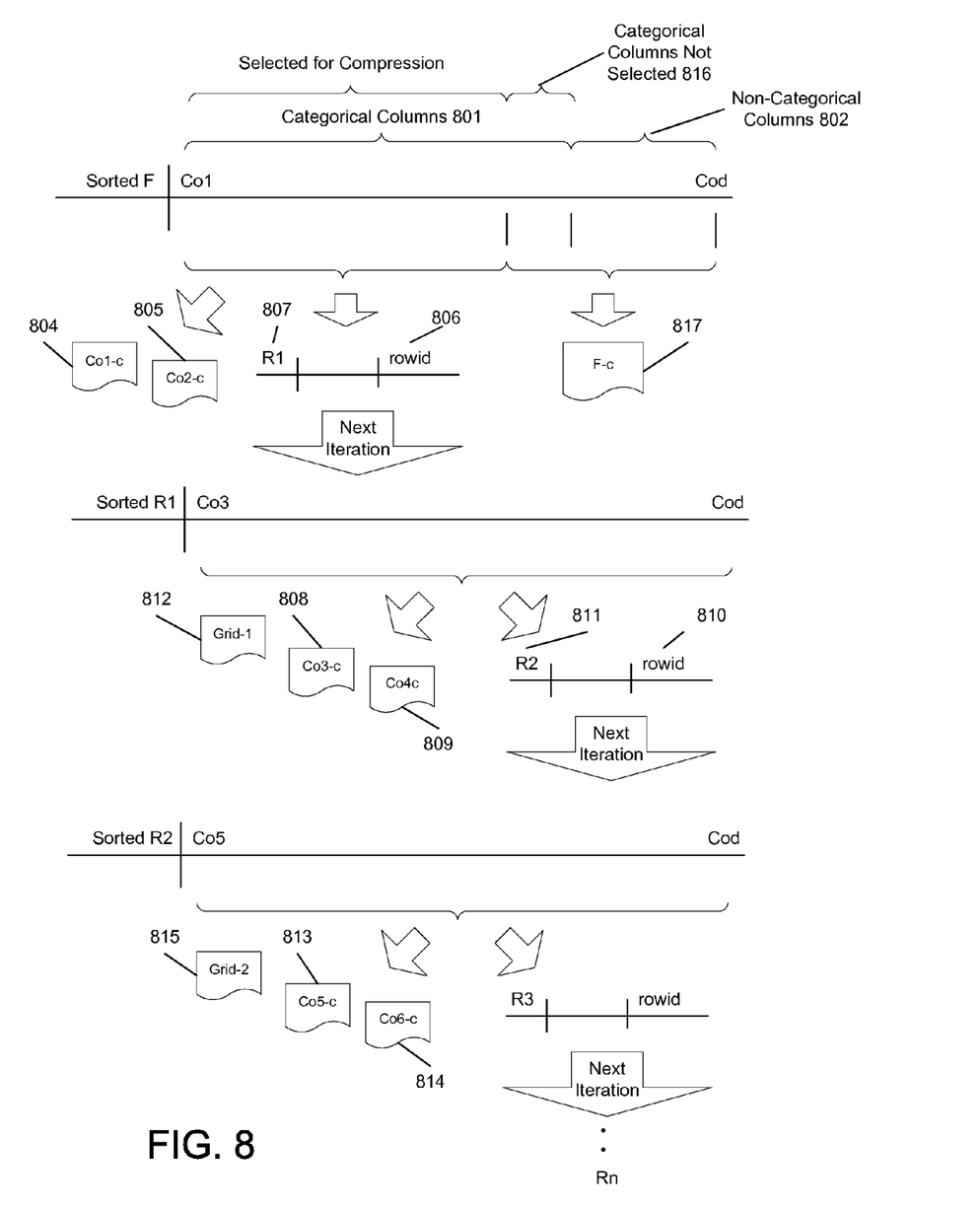
FIGS. 8-9 illustrate examples of the compression and decompression, respectively, of table columns for data movement according to an embodiment of the present invention.
Figure 9:
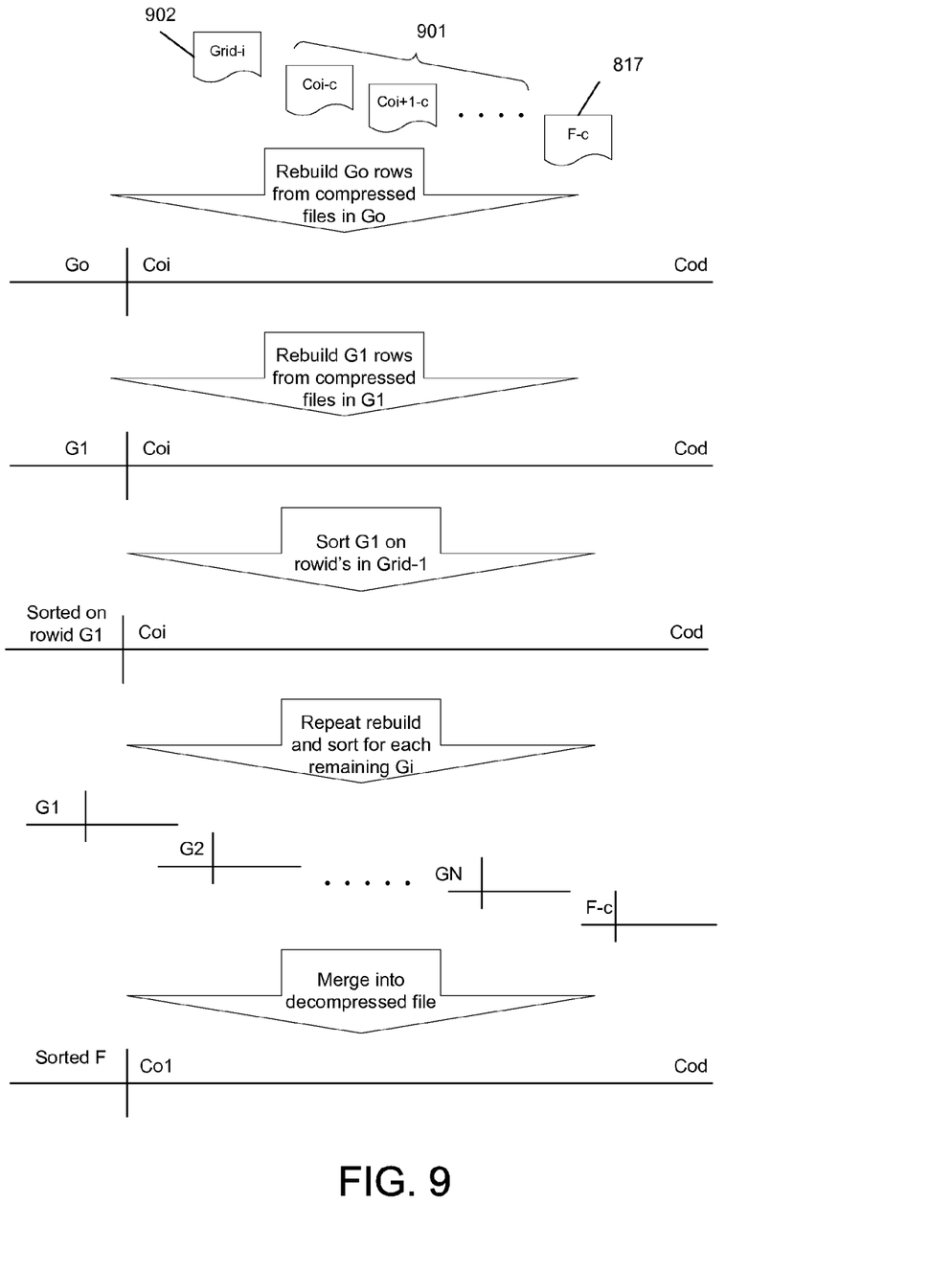

FIGS. 8-9 illustrate examples of the compression and decompression, respectively, of table columns for data movement according to an embodiment of the present invention. Referring to FIGS. 5 and 8, rows of a table T are sorted according to the order of columns (501-503) and stored in sorted file F. The columns ($c_{o1}$-$c_{od}$) in sorted file F include categorical columns 801 and non-categorical columns 802. The compression ratio for each column in sorted file F is calculated (504). A first group $G_o$ of one or more of the categorical columns is selected for compression based on each column's compression ratio (504-505). Assume in this example that columns, $c_{o1}$ and $c_{o2}$, are selected for compression in group $G_o$.

Assume that the compression threshold has not been met (506). A group $G_1$ of one or more categorical columns in $R_1$ is selected for compression based on each column's compression ratio (507). Assume in this example that columns, $c_{o3}$ and $c_{o4}$, respectively, are selected for compression. A group $G_2$ of one or more columns in $R_2$ is selected for compression based on each column's compression ratio (507). Assume in this example that columns, $c_{o5}$ and $c_{o6}$, are selected for compression. The above process is then repeated for each subsequent iteration $R_3$-$R_n$ to identify additional groups $G_3$-$G_n$ until the compression threshold is reached (506). Categorical columns not selected for compression 816 and non-categorical columns 802 are stored in file F-c 817 in its initial row sort order in sorted file F (508).

Once the compression groups $G_o$-$G_n$ are identified, compression may be performed. Compression files $c_{o1-c}$ 804 and $c_{o2-c}$ 805 are created to comprise compressed representations of columns $c_{o1}$ and $c_{o2}$, respectively, in group $G_o$ (509). A ROWID column 806 is added to the remaining columns $R_1$ 807 (510). The number of distinct values for the columns $R_1$ in group $G_1$ is recalled (511), and the rows are sorted according to the order of columns (512). Compression files $c_{o3-c}$ 808 and $c_{o4-c}$ 809 are created to comprise compressed representations of columns $c_{o3}$ and $c_{o4}$ in group $G_1$ (513). The ROWID column 806 is stored in a $G_{rid-1}$ file 812 corresponding to group $G_1$ (514). The names of compression files 808 and 809 would include the group and column position metadata for group $G_1$ (515).

The number of distinct values for columns $R_2$ in group $G_2$ is then recalled (511), and the rows in group $G_2$ are sorted according to the order of columns (512). Compression files $c_{o5-c}$ 813 and $c_{o6-c}$ 814 are created to comprise compressed representations of columns $c_{o5}$ and $c_{o6}$, respectively, in group $G_2$ (513). The ROWID column 810 is stored in a $G_{rid-2}$ file 815 corresponding to group $G_2$ (514). The names of compression files 813 and 814 would include the group and column position metadata for group $G_2$ (515). The compression process (511-515) is repeated for each of the remaining groups $G_3$-$G_n$.

The file F-c 817, each compression file with files names storing the group and column position metadata, and the $G_{rid-i}$ files are sent to the target system (517).

Referring to FIGS. 7 and 9, the target system receives the compression files 901 comprising the compressed representations of categorical columns of the table (701), the $G_{rid-i}$ files 902 corresponding to each group and recording the initial row sort orders for each group (702), and the uncompressed file F-c 817 comprising columns of the table not selected for compression and in initial row sort order of sorted file F (704). With the example illustrated in FIG. 8, the compression files 901 include $c_{o1-c}$ 805, $c_{o2-c}$ 806, $c_{o3-c}$ 808, $c_{o4-c}$ 809, $c_{o5-c}$ 813, $c_{o6-c}$ 814, as well as other compression files generated in subsequent iterations. The $G_{rid-i}$ files include $G_{rid-1}$ 812 and $G_{rid-2}$ 815, as well as other $G_{rid}$ files generated in subsequent iterations. In the compression file names, the target system receives the group and column position metadata corresponding to each group (703). The decompression algorithm rebuilds the categorical columns in group $G_o$ represented in the compression files $c_{o1-c}$ 804 and $c_{o2-c}$ 805. Since the rows in group $G_o$ are already in the initial row sort order in sorted file F, there is no corresponding $G_{rid-i}$ file and the sorting of rebuilt rows is not necessary. The decompression algorithm also rebuilds the categorical columns in group $G_1$ represented in the compression files $c_{o3-c}$ 808 and $c_{o4-c}$ 809 of group $G_1$, using the group and column position metadata stored in the compression file names (705). The rows in the group $G_1$ comprising the rebuilt categorical columns are then sorted on the ROWID's stored in the corresponding $G_{rid-i}$ file 812 (706). This process (705-706) is repeated for each of the remaining groups $G_2$-$G_n$. For the first group $G_o$ The rows rebuilt from each group $G_o$-$G_n$ are then merged with the rows in the uncompressed file F-c 817, resulting in the sorted file F (707).

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for compressing data for database movement, comprising:
    selecting a first group of one or more categorical columns of a table for compression comprising:
        computing a number of distinct values for each column in the table;
        determining an order of the columns in increasing number of distinct values;
        sorting rows in the table according to the order of columns;
        calculating a compression ratio for each column in the sorted table; and
        selecting the first group of the one or more categorical columns for compression based on the compression ratio for each column in the sorted table;
    selecting a next group of one or more categorical columns from remaining columns of the table for compression;
    repeating the selecting of the next group of one or more categorical columns from the remaining columns of the table for compression until a predetermined compression threshold is met;
    creating a first plurality of compression files comprising compressed representations of the columns in the first group;
    creating a next plurality of compression files comprising compressed representations of the columns in each of the next groups;
    storing an initial row sort order, a group identity, and column positions corresponding to each of the next groups; and
    storing any columns of the table not selected for compression in an uncompressed file in the initial row sort order.

2. The method of claim 1, wherein the calculating the compression ratio for each column in the sorted table comprises:
    calculating a number of lines needed to represent each column in compressed format to a total number of lines in the table.

3. The method of claim 1, wherein the creating of the next plurality of compression files comprising compressed representations of the columns in each of the next groups, comprises:
    adding a ROWID columns to remaining categorical columns to record the initial row sort order; and
    for each next group:
        recalling a number of distinct values for the columns in the next group;
        sorting the columns in the next group according to the recalled number of distinct values; and
        creating one or more compression files comprising compressed representations of the columns in the next group.

4. The method of claim 1, wherein the storing of the initial row sort order, the group identity, and the column positions corresponding to each of the next groups comprises, for each next group:
    storing the initial row sort order for the categorical columns in the next group in a sort order file corresponding to the next group; and
    storing the group identity for the next group and the column positions for the categorical columns in the next group in the file names of the next plurality of compression files.

5. The method of claim 1, wherein the storing of any columns of the table not selected for compression in the uncompressed file in the initial row sort order comprises:
    storing any non-categorical columns of the table and any categorical columns of the table not selected for compression in the uncompressed file in the initial row sort order.

6. A computer program product for compressing data for database movement, the computer program product comprising:
    a non-transitory computer readable storage medium having computer readable program code embodied therewith, the program code executable by a processor to:
    select a first group of one or more categorical columns of a table for compression comprising:
        compute a number of distinct values for each column in the table;
        determine an order of the columns in increasing number of distinct values;
        sort rows in the table according to the order of columns;
        calculate a compression ratio for each column in the sorted table; and
        select the first group of the one or more categorical columns for compression based on the compression ratio for each column in the sorted table;
    select a next group of one or more categorical columns from remaining columns of the table for compression;
    repeat the selecting of the next group of one or more categorical columns from the remaining columns of the table for compression until a predetermined compression threshold is met;
    create a first plurality of compression files comprising compressed representations of the columns in the first group;
    create a next plurality of compression files comprising compressed representations of the columns in each of the next groups;
    store an initial row sort order, a group identity, and column positions corresponding to each of the next groups; and
    store any columns of the table not selected for compression in an uncompressed file in the initial row sort order.

7. The computer program product of claim 6, wherein the program code executable by the processor to calculate the compression ratio for each column in the sorted table comprises program code executable by the processor to:
    calculate a number of lines needed to represent each column in compressed format to a total number of lines in the table.

8. The computer program product of claim 6, wherein the program code executable by the processor to create the next plurality of compression files comprising the compressed representations of the columns in each of the next groups comprises program code executable by the processor to:
    add a ROWID columns to remaining categorical columns to record the initial row sort order; and
    for each next group:
        recall a number of distinct values for the columns in the next group;
        sort the columns in the next group according to the recalled number of distinct values; and
        create one or more compression files comprising compressed representations of the columns in the next group.

9. The computer program product of claim 6, wherein the program code executable by the processor to store the initial row sort order, the group identity, and the column positions corresponding to each of the next groups comprises program code executable by the processor to, for each next group:
    store the initial row sort order for the categorical columns in the next group in a sort order file corresponding to the next group; and
    store the group identity for the next group and the column positions for the categorical columns in the next group in the file names of the next plurality of compression files.

10. The computer program product of claim 6, wherein the program code executable by the processor to store any columns of the table not selected for compression in the uncompressed file in the initial row sort order comprises program code executable by the processor to:
    store any non-categorical columns of the table and any categorical columns of the table not selected for compression in the uncompressed file in the initial row sort order.

11. A system comprising:
    a processor; and
    a computer readable storage memory having computer readable program code embodied therewith, the program code executable by a processor to:
    select a first group of one or more categorical columns of a table for compression comprising:
        compute a number of distinct values for each column in the table;
        determine an order of the columns in increasing number of distinct values;
        sort rows in the table according to the order of columns;
        calculate a compression ratio for each column in the sorted table; and
        select the first group of the one or more categorical columns for compression based on the compression ratio for each column in the sorted table;
    select a next group of one or more categorical columns from remaining columns of the table for compression;
    repeat the selecting of the next group of one or more categorical columns from the remaining columns of the table for compression until a predetermined compression threshold is met;
    create a first plurality of compression files comprising compressed representations of the columns in the first group;
    create a next plurality of compression files comprising compressed representations of the columns in each of the next groups;
    store an initial row sort order, a group identity, and column positions corresponding to each of the next groups; and
    store any columns of the table not selected for compression in an uncompressed file in the initial row sort order.

12. The system of claim 11, wherein the program code executable by the processor to calculate the compression ratio for each column in the sorted table comprises program code executable by the processor to:
    calculate a number of lines needed to represent each column in compressed format to a total number of lines in the table.

13. The system of claim 11, wherein the program code executable by the processor to create the next plurality of compression files comprising compressed representations of the columns in each of the next groups comprises program code executable by the processor to:

add a ROWID columns to remaining categorical columns to record the initial row sort order; and     for each next group:

recall a number of distinct values for the columns in the next group;

sort the columns in the next group according to the recalled number of distinct values; and         create one or more compression files comprising compressed representations of the columns in the next group.

14. The system of claim 11, wherein the program code executable by the processor to store the initial row sort order, the group identity, and the column positions corresponding to each of the next groups comprises program code executable by the processor to, for each next group:

store the initial row sort order for the categorical columns in the next group in a sort order file corresponding to the next group; and     store the group identity for the next group and the column positions for the categorical columns in the next group in the file names of the next plurality of compression files.

15. The system of claim 11, wherein the program code executable by the processor to store any columns of the table not selected for compression in the uncompressed file in the initial row sort order comprises program code executable by the processor to:

store any non-categorical columns of the table and any categorical columns of the table not selected for compression in the uncompressed file in the initial row sort order.

\* \* \* \* \*